(12) United States Patent
Takagi et al.

(10) Patent No.: US 7,143,282 B2
(45) Date of Patent: Nov. 28, 2006

(54) COMMUNICATION CONTROL SCHEME USING PROXY DEVICE AND SECURITY PROTOCOL IN COMBINATION

(75) Inventors: Masahiro Takagi, Tokyo (JP); Masahiro Ishiyama, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 698 days.

(21) Appl. No.: 09/862,440

(22) Filed: May 23, 2001

(65) Prior Publication Data

US 2001/0047474 A1    Nov. 29, 2001

(30) Foreign Application Priority Data

May 23, 2000    (JP)    ............................ P2000-151434

(51) Int. Cl.
  G06F 9/00     (2006.01)
  G06F 17/00    (2006.01)
  H04L 9/00     (2006.01)
(52) U.S. Cl. .................. 713/153; 713/151; 713/160; 726/12; 370/392; 370/401; 370/469
(58) Field of Classification Search ................ 713/153, 713/156, 201
  See application file for complete search history.

(56) References Cited

U.S. PATENT DOCUMENTS

| | | | |
|---|---|---|---|
| 5,416,842 A * | 5/1995 | Aziz ........................... | 713/156 |
| 6,091,733 A | 7/2000 | Takagi et al. | |
| 6,170,057 B1 * | 1/2001 | Inoue et al. ................. | 713/153 |
| 6,438,612 B1 * | 8/2002 | Ylonen et al. ............... | 713/201 |
| 6,507,908 B1 * | 1/2003 | Caronni ....................... | 713/153 |

FOREIGN PATENT DOCUMENTS

| | | |
|---|---|---|
| JP | 11-88431 | 3/1999 |
| JP | 11-163946 | 6/1999 |

OTHER PUBLICATIONS

Ajay Bakre, et al., "I-TCP: Indirect TCP for Mobile Host", IEEE, May 1995, pp. 136-143.
Hari Balakrishnan, et al., "Improving Reliable Transport and Handoff Performance in Cellular Wireless Networks", Wireless Netoworks 1, 1995, pp. 469-481.
Toshikazu Yamaguchi et al, "A Desgin for LAN Cipher Communications", Technical Report of IEICE, OFS93-32, Jan. 21, 1994.

* cited by examiner

Primary Examiner—Gilberto Barrón, Jr.
Assistant Examiner—A. Nobahar
(74) Attorney, Agent, or Firm—Oblon, Spivak, McClelland, Maier & Neustadt, P.C.

(57) ABSTRACT

In a gateway device for carrying out a data relaying at a transport or upper layer between a first terminal device and a second terminal device which are capable of carrying out communications through networks, information regarding a security association set up between the first terminal device and the second terminal device in order to carry out communications with guaranteed data secrecy or in order to carry out communications with guaranteed data authenticity managed, and the decryption/encryption processing or the authentication processing is carried out according to the managed information regarding the security association along with the data relaying at the transport or upper layer.

23 Claims, 9 Drawing Sheets

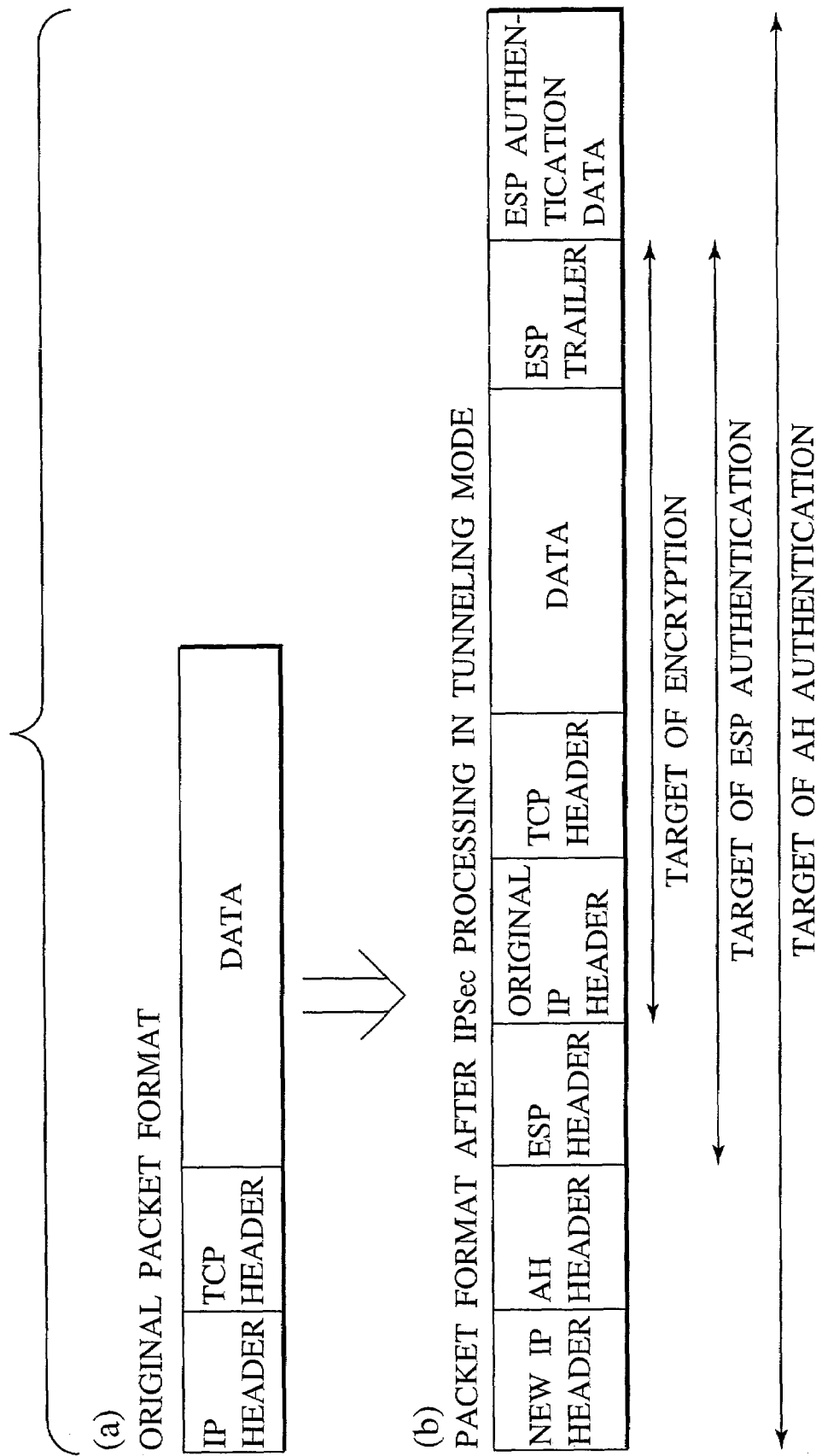

COMMUNICATION CONTROL SCHEME USING PROXY DEVICE AND SECURITY PROTOCOL IN COMBINATION

BACKGROUND OF THE INVENTION

1. Field of the Invention

The present invention relates to a communication control scheme for communications utilizing the transport layer.

2. Description of the Related Art

In recent years, there are increasing demands for data communications by using radio in addition to speech communications. TCP (Transmission Control Protocol) has been widely used as a reliable transport layer protocol in wired data communications, but the direct application of this protocol to radio communications causes the following problems.

A TCP packet loss in the wired communications implies a congestion of the network, so that TCP is designed to avoid the congestion by lowering the data transmission rate upon detecting the packet loss. The packet loss is detected when more than or equal to a prescribed number (usually three in addition to the original) of ACK having the same sequence number are received, and when a time-out of a timer that is set according to RTT (Round Trip Time) and its variance occurs.

As a consequence, the TCP packet loss due to a radio section error and a handoff, or the case where the error recovery at the link layer takes a considerable time, will be interpreted as the congestion and the congestion avoidance will be made more than necessary, so that the throughput often falls below the available radio bandwidth. Also, the end-to-end re-transmission by TCP with respect to a radio section error will be time consuming and wasting the bandwidth in the wired section. Also, in the case where the error recovery is made at the link layer, the same data will be transmitted redundantly.

In order to resolve these problems, there are some propositions of methods for inserting a proxy (PEP: Performance Enhancement Proxy) for improving the performance of TCP between a wired side terminal and a radio side terminal (at a border between a radio side and a wired side in many cases).

A method based on Split connection is a method for dividing the TCP connection at the Proxy (which will be referred to as TCP-GW hereafter) into a wired side TCP connection and a radio side TCP connection. Here, the case of transmitting data from the wired terminal to the radio terminal will be considered.

The TCP-GW returns ACK to the wired terminal on behalf of the radio terminal, so that the influence of a radio error (a packet loss or a large delay fluctuation) will be concealed from the wired terminal. When the TCP data packet is lost, the TCP-GW carries out the data re-transmission on behalf of the wired terminal. The radio side TCP may be tuned specifically for radio side use. For example, the the radio side TCP may use the selective ACK option (IETF RFC 2018) so as not to degrade the performance considerably even in the case of high packet loss rate. Also, the radio side TCP may use a modified congestion control algorithm so as not to excessively narrow the bandwidth even when the TCP packet loss occurs.

A method based on Snoop proxy is a method for dealing with a problem that the end-to-end semantics of TCP (i.e., when ACK of TCP returns to a transmitting terminal, data up to the sequence number of that ACK have reached to a receiving terminal) are violated when the TCP connection is regarded as terminated by the TCP-GW. The Snoop proxy buffers the TCP data packet but does not return ACK to the transmitting terminal at that point. When ACK is returned from the actual receiving terminal, the Snoop proxy relays ACK to the transmitting terminal and discards the buffered TCP data packet. Here, however, when ACK is a redundant ACK for triggering the re-transmission from the actual transmitting terminal, the Snoop proxy discards the redundant ACK and carries out the re-transmission of the TCP data packet. The Snoop proxy also carries out the time-out re-transmission. In this way, most of the influences of radio errors are concealed from the transmitting terminal.

On the other hand, in such radio data communications, there are great demands for the security because anyone in a vicinity can eavesdrop radio signals and the mobile environment is used in many cases.

One known method for ensuring the security on the Internet is the IPSec (IETF RFC 2401, 2402 and 2048). The security can be provided at various layers, and the IPsec is a scheme for ensuring the security at the IP layer. In the IPSec, there are functions for guaranteeing (1) that the IP header is not altered on the route, (2) that data of the IP payload are not altered on the route, and (3) that the data are generated by the actual sender. To this end, there is a need to insert AH (Authentication Header) between the IP header and the IP payload. There are also functions for guaranteeing the secrecy, the absence of alteration, and the generation by the sender with respect to the IP payload. To this end, ESP (Encapsulating Security Payload) is used. Note that AH and ESP can be used in combination.

Also, the IPSec and the Mobile IP utilize a technique for transmitting the actual packet by encapsulating it in another packet at a gateway device or an agent device that has functions of the IPSec of the Mobile IP, to a gateway device, an agent device, or a terminal that is the actual destination of that packet. A route through which the actual packet passes in an encapsulated form will be referred to as a tunnel.

As described, in the case of carrying out communications between a radio terminal device accommodated in a radio network and a wired terminal device accommodated in a wired network, there are great demands in the radio data communication environment for both a device for improving the performance of TCP such as TCP-GW or Snoop proxy and a method for providing the security such as IPSec, but a combined use of such a device and a method causes the following problem.

Namely, the TCP header is contained in the IP payload that is protected by the IPSec, but a proxy for improving the performance of TCP needs to know information contained in the TCP header and to change it whenever necessary. Moreover, when the absence of alteration in the data to be transmitted is guaranteed, it becomes impossible for the TCP-GW to transmit ACK on behalf of the actual receiving terminal, because there would be a need for the TCP-GW itself to generate ACK information. In addition, when the secrecy of the data to be transmitted is required, it becomes impossible for the TCP-GW or Snoop proxy to operate effectively because it becomes impossible to read the TCP header information.

Also, when the proxy device is located in a middle of the "tunnel" utilized in the IPSec or the Mobile IP, this proxy device does not function effectively. This is because, even when the TCP-GW checks the header of the encapsulated packet in order to realize the filtering as to whether the encapsulated packet should be processed or not, for example, this header does not indicate that the payload is the TCP packet.

BRIEF SUMMARY OF THE INVENTION

It is therefore an object of the present invention to provide a gateway device and a communication control scheme which can enable efficient data communications between a radio terminal device and a wired terminal device while maintaining the security and which are capable of functioning effectively even with respect to the encapsulated packet that passes through the "tunnel" utilized in the IPSec or the Mobile IP, by combining the proxy device such as TCP-GW or Snoop proxy and the security protocol such as IPSec.

According to one aspect of the present invention there is provided a gateway device for carrying out a data relaying at a transport or upper layer between a first terminal device and a second terminal device which are capable of carrying out communications through networks, the gateway device comprising: a security information management unit configured to manage information regarding a security association set up between the first terminal device and the second terminal device in order to carry out communications with guaranteed data secrecy between the first terminal device and the second terminal device; a data decryption unit configured to obtain decrypted data by decrypting encrypted data received from the first terminal device or the second terminal device, by utilizing the information regarding the security association at a time of relaying the communications with guaranteed data secrecy between the first terminal device and the second terminal device; a data relay unit configured to carry out the data relaying at the transport or upper layer according to the decrypted data; and a data encryption unit configured to encrypt data to be transmitted from the gateway device by utilizing the information regarding the security association.

According to another aspect of the present invention there is provided a gateway device for carrying out a data relaying at a transport or upper layer between a first terminal device and a second terminal device which are capable of carrying out communications through networks, the gateway device comprising: a security information management unit configured to manage information regarding a security association set up between the first terminal device and the second terminal device in order to carry out communications with guaranteed data authenticity between the first terminal device and the second terminal device; a data relay unit configured to carry out the data relaying at the transport or upper layer; and an authentication information attaching unit configured to attach authentication information to data to be transmitted from the gateway device by utilizing the information regarding the security association.

According to another aspect of the present invention there is provided a method for carrying out a data relaying at a transport or upper layer in a gateway device between a first terminal device and a second terminal device which are capable of carrying out communications through networks, the method comprising: managing information regarding a security association set up between the first terminal device and the second terminal device in order to carry out communications with guaranteed data secrecy between the first terminal device and the second terminal device; obtaining decrypted data by decrypting encrypted data received from the first terminal device or the second terminal device, by utilizing the information regarding the security association at a time of relaying the communications with guaranteed data secrecy between the first terminal device and the second terminal device; carrying out the data relaying at the transport or upper layer according to the decrypted data; and encrypting data to be transmitted from the gateway device by utilizing the information regarding the security association.

According to another aspect of the present invention there is provided a method for carrying out a data relaying at a transport or upper layer in a gateway device between a first terminal device and a second terminal device which are capable of carrying out communications through networks, the method comprising: managing information regarding a security association set up between the first terminal device and the second terminal device in order to carry out communications with guaranteed data authenticity between the first terminal device and the second terminal device; carrying out the data relaying at the transport or upper layer; and attaching authentication information to data to be transmitted from the gateway device by utilizing the information regarding the security association.

According to another aspect of the present invention there is provided a computer usable medium having computer readable program codes embodied therein for causing a computer to function as a gateway device for carrying out a data relaying at a transport or upper layer between a first terminal device and a second terminal device which are capable of carrying out communications through networks, the computer readable program codes include: a first computer readable program code for causing said computer to manage information regarding a security association set up between the first terminal device and the second terminal device in order to carry out communications with guaranteed data secrecy between the first terminal device and the second terminal device; a second computer readable program code for causing said computer to obtain decrypted data by decrypting encrypted data received from the first terminal device or the second terminal device, by utilizing the information regarding the security association at a time of relaying the communications with guaranteed data secrecy between the first terminal device and the second terminal device; a third computer readable program code for causing said computer to carry out the data relaying at the transport or upper layer according to the decrypted data; and a fourth computer readable program code for causing said computer to encrypt data to be transmitted from the gateway device by utilizing the information regarding the security association.

According to another aspect of the present invention there is provided a computer usable medium having computer readable program codes embodied therein for causing a computer to function as a gateway device for carrying out a data relaying at a transport or upper layer between a first terminal device and a second terminal device which are capable of carrying out communications through networks, the computer readable program codes include: a first computer readable program code for causing said computer to manage information regarding a security association set up between the first terminal device and the second terminal device in order to carry out communications with guaranteed data authenticity between the first terminal device and the second terminal device; a second computer readable program code for causing said computer to carry out the data relaying at the transport or upper layer; and a third computer readable program code for causing said computer to attach authentication information to data to be transmitted from the gateway device by utilizing the information regarding the security association.

Other features and advantages of the present invention will become apparent from the following description taken in conjunction with the accompanying drawings.

BRIEF DESCRIPTION OF THE DRAWINGS

FIG. 9 is a diagram showing another exemplary packet formats before and after the IPSec processing to be carried out at the TCP-GW of FIG. 2.

DETAILED DESCRIPTION OF THE INVENTION

Referring now to FIG. 1 to FIG. 9, one embodiment of the present invention will be described in detail.

Figure 1:
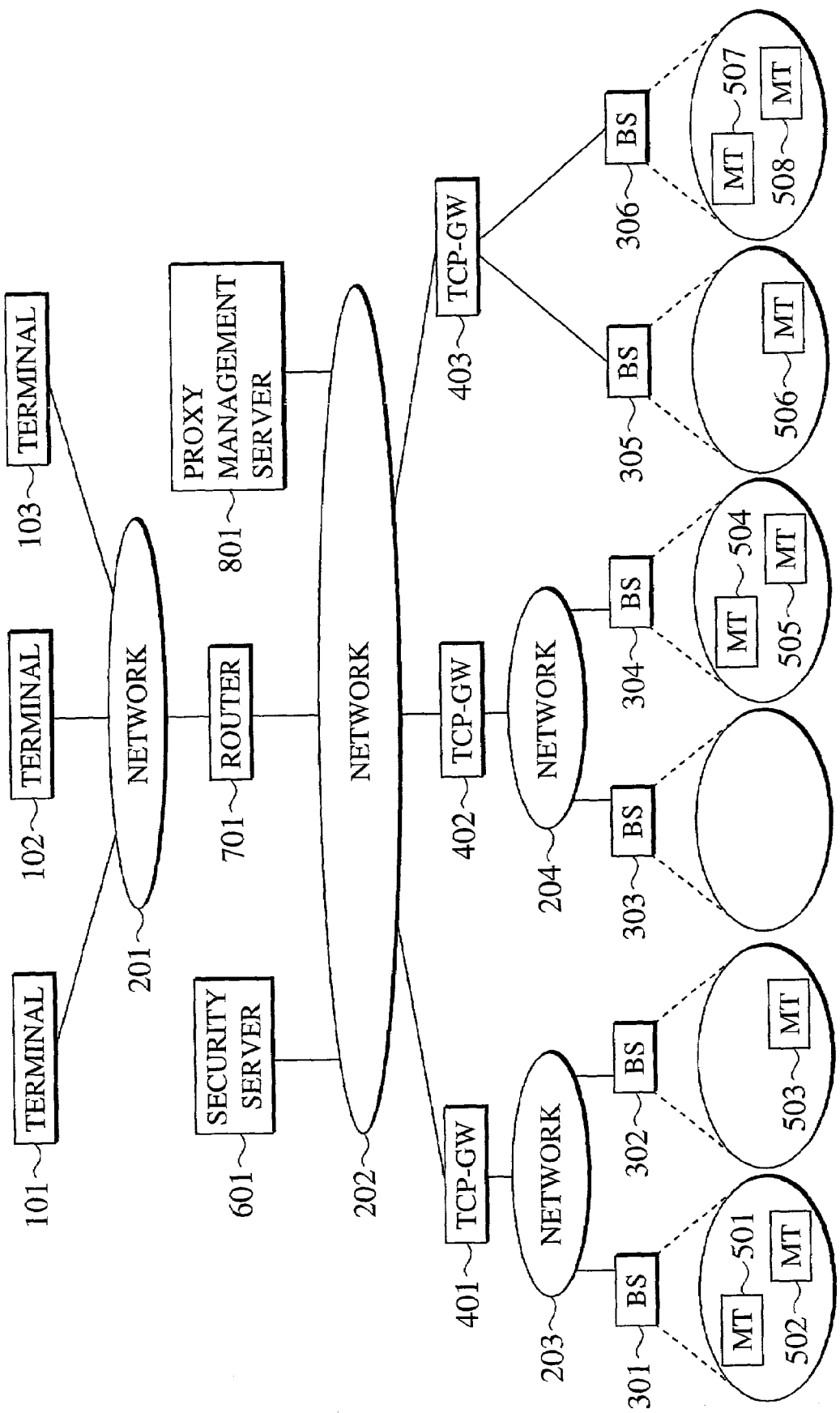
FIG. 1 is a block diagram showing an exemplary network configuration according to one embodiment of the present invention.

FIG. 1 shows an exemplary network configuration in this embodiment, which is largely divided into a network 201 side and a network 202 side at a router 701. These two sides may be managed by different network management entities. The network 201 accommodates TCP/IP terminals 101 to 103 (wired terminal devices) that are accommodated in a wired network, which are interconnected with the network 202 by the router 701 for exchanging IP packets. Here, more than one networks similar to the network 201 may be connected to the network 202. Also, the network 201 may be also interconnected with networks other than the network 202.

Here, it is assumed that the network 202 side supports the mobility, although the presence/absence of the mobility is unrelated to the essence of the present invention. The mobility can be realized at the IP layer as in the Mobile IP or at a link layer as in the cellular network, and any way of realizing the mobility can be used. Note that elements necessary in realizing the mobility are omitted in the figures. The network 202 accommodates networks 203 and 204 through TCP-GWs 401 and 402 respectively, as well as base stations 305 and 306 through a TCP-GW 403.

Each TCP-GW can be a node having a link layer retransmission function in view of TCP such as Snoop proxy, or a proxy device in general, but will be referred to as TCP-GW in the following. Moreover, the network 202 has a security server 601. The network 203 accommodates base stations 301 and 302, while the network 204 accommodates base stations 303 and 304.

FIG. 1 shows a state in which mobile terminals 501 and 502 accommodated in the radio network are located in an area of the base station 301, a mobile terminal 503 accommodated in the radio network is located in an area of the base station 302, mobile terminals 504 and 505 accommodated in the radio network are located in an area of the base station 304, a mobile terminal 506 accommodated in the radio network is located in an area of the base station 305, and mobile terminals 507 and 508 accommodated in the radio network are located in an area of the base station 306, The mobile terminals 501 to 508 (radio terminal devices) are TCP/IP terminals.

Figure 2:
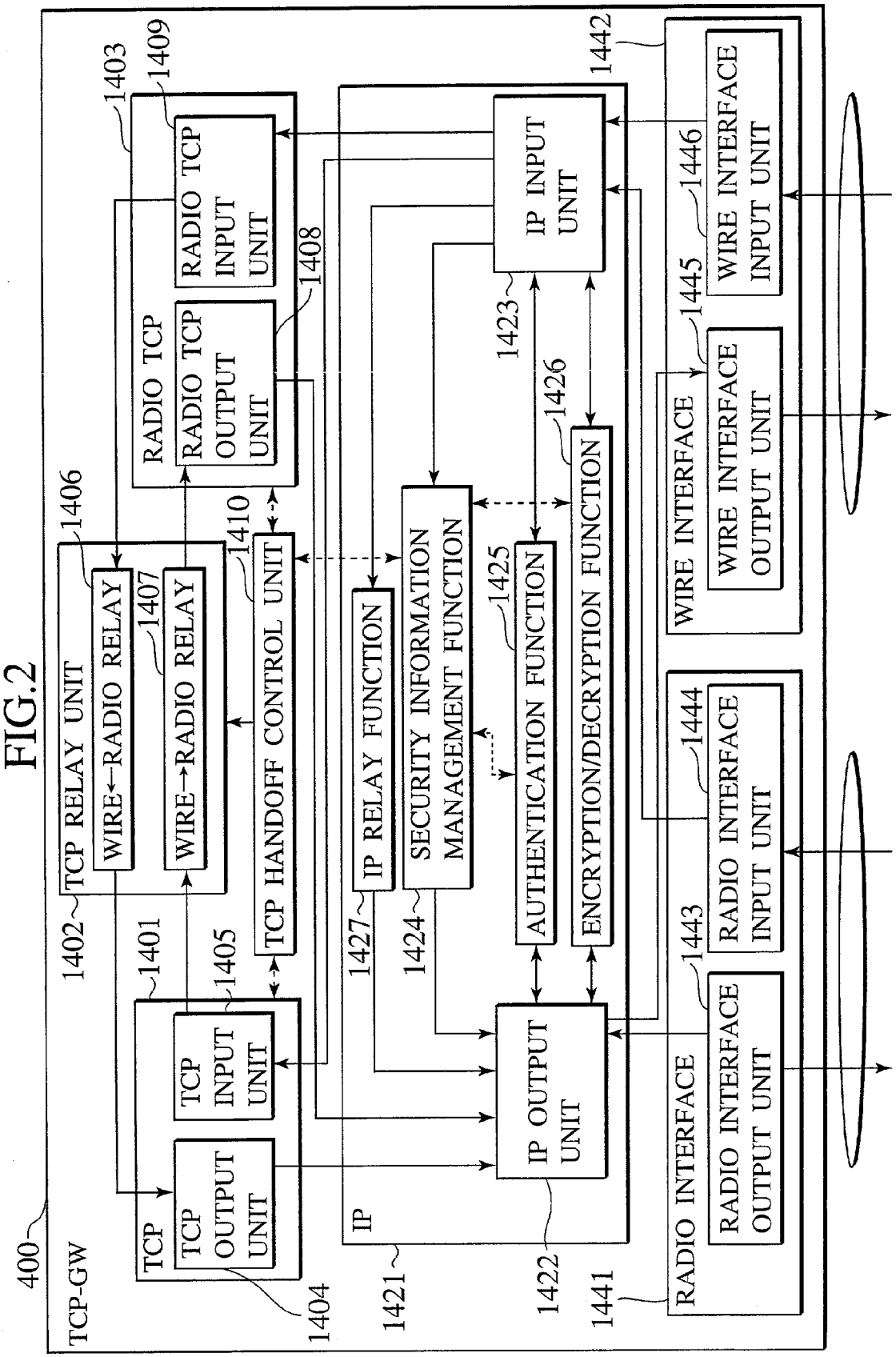
FIG. 2 is a block diagram showing an exemplary configuration of a TCP-GW in the network configuration of FIG. 1.
Figure 3:
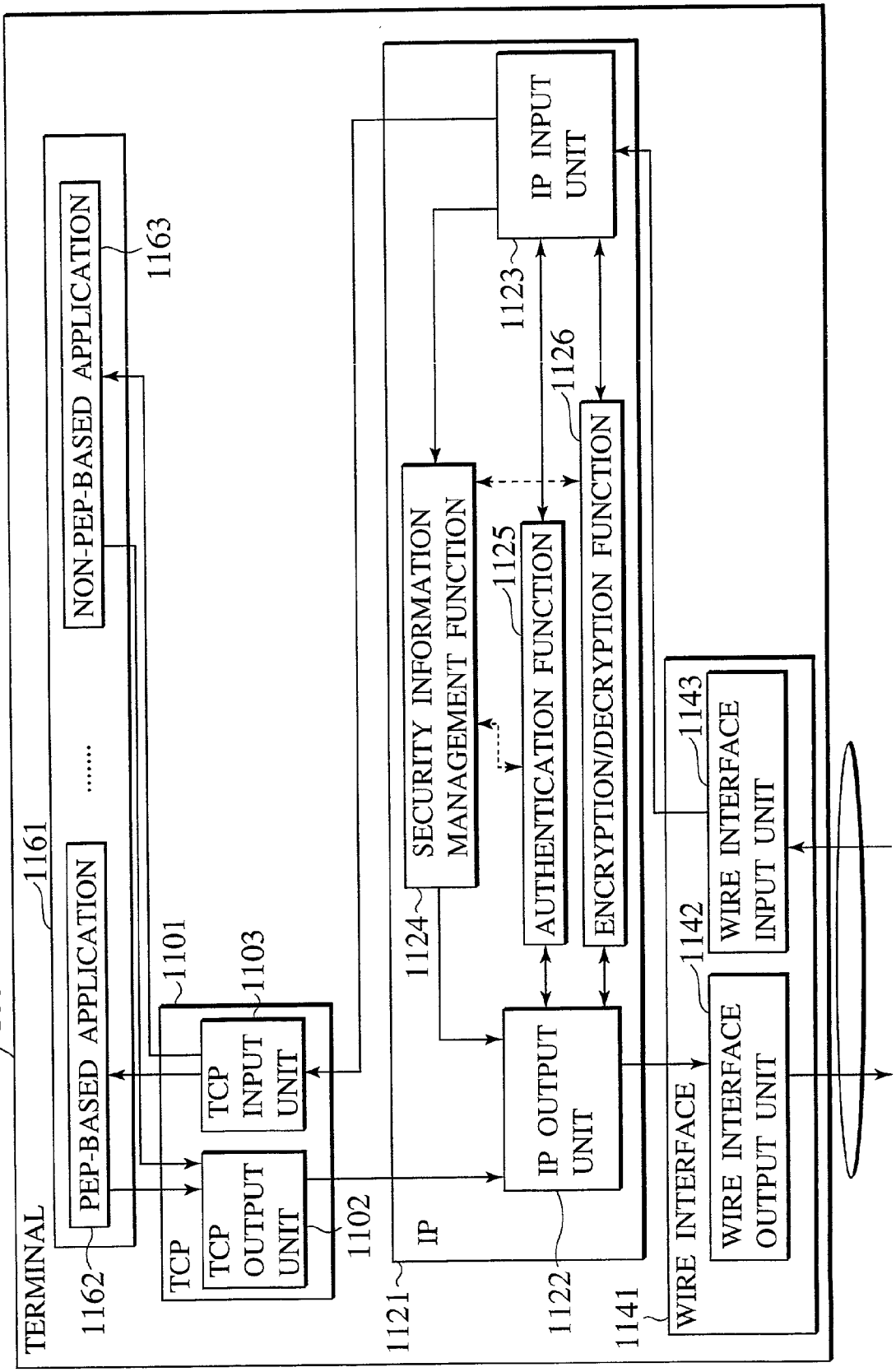
FIG. 3 is a block diagram showing an exemplary configuration of a terminal with IPSec function in the network configuration of FIG. 1.
Figure 4:
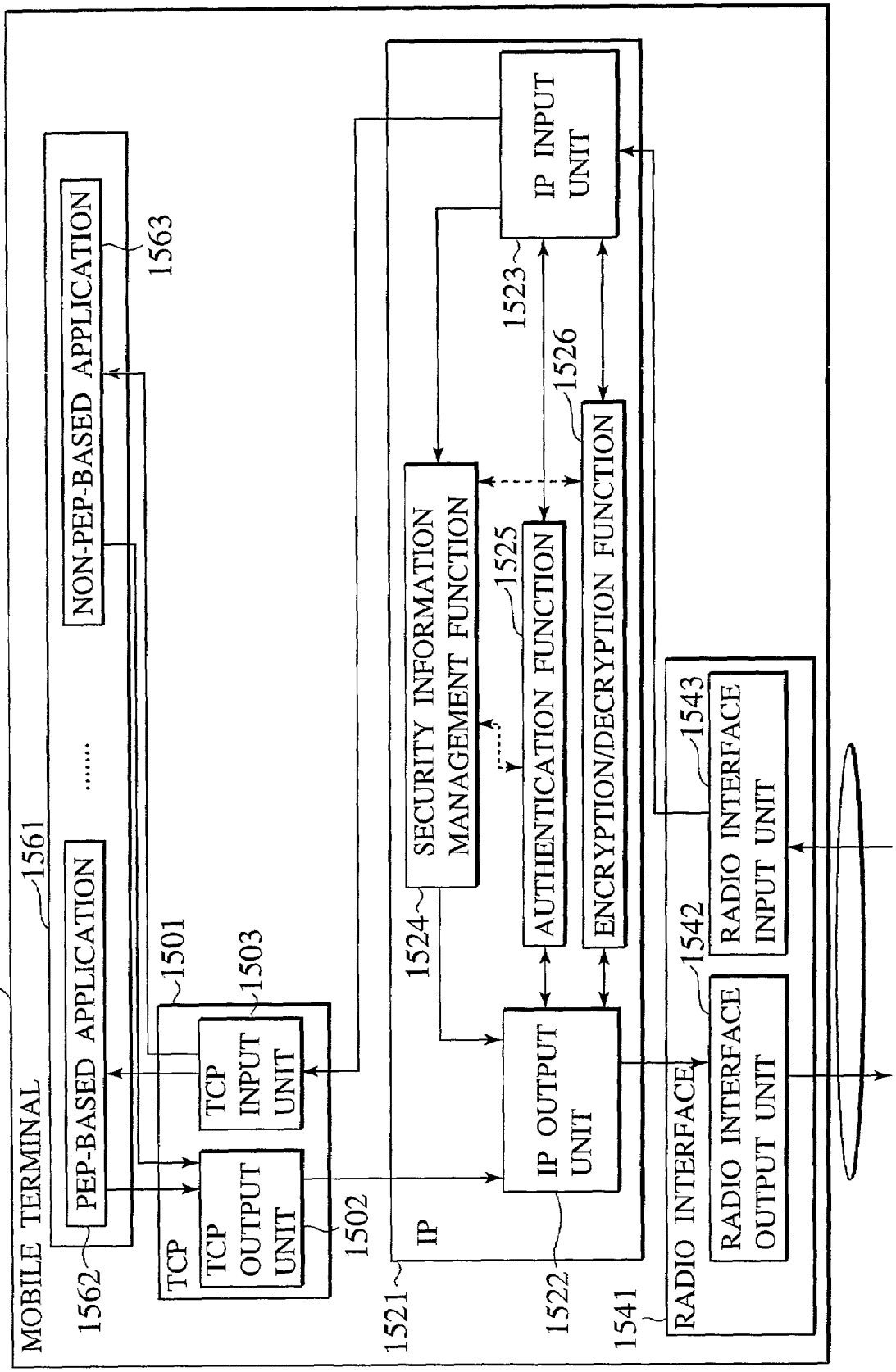
FIG. 4 is a block diagram showing an exemplary configuration of a mobile terminal in the network configuration of FIG. 1.
Figure 5:
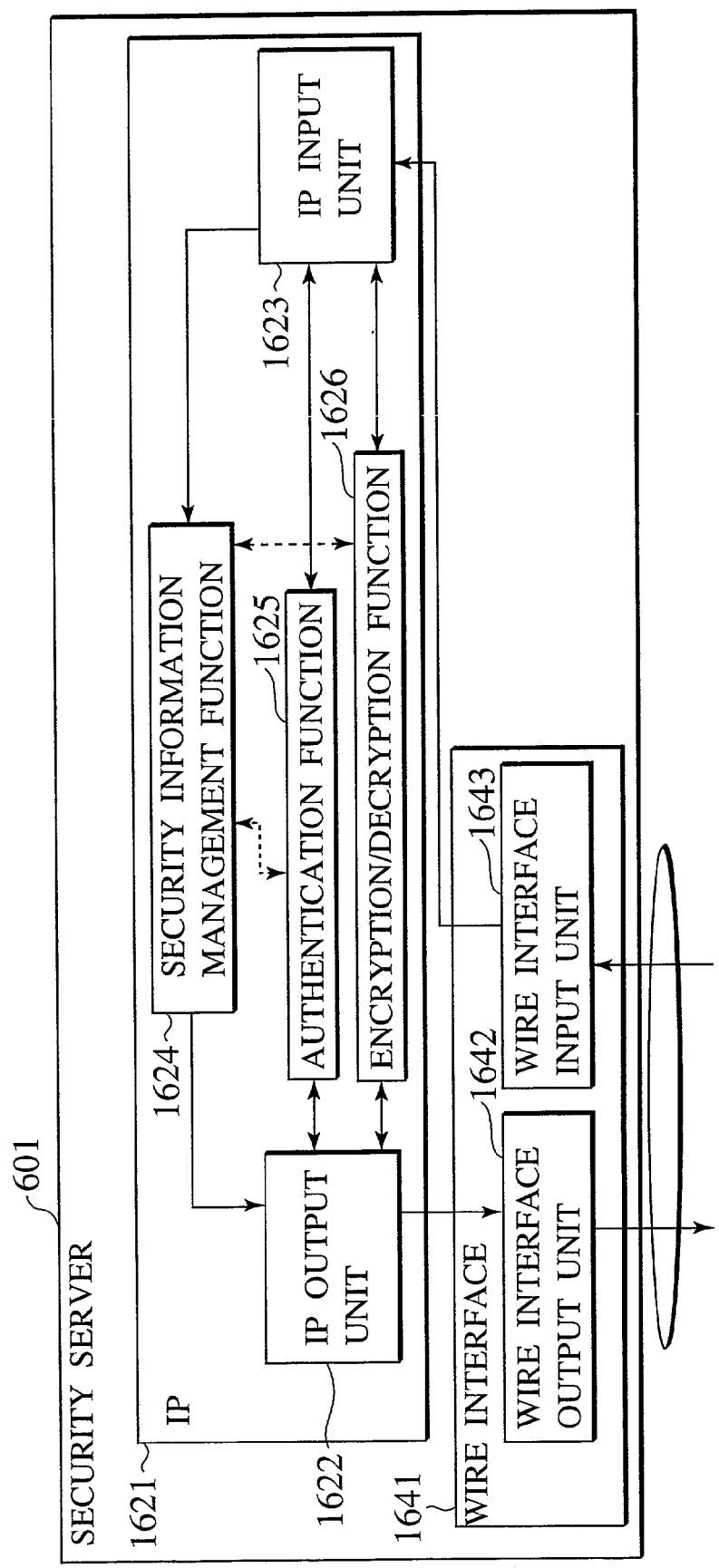
FIG. 5 is a block diagram showing an exemplary configuration of a security server in the network configuration of FIG. 1.
Figure 6:
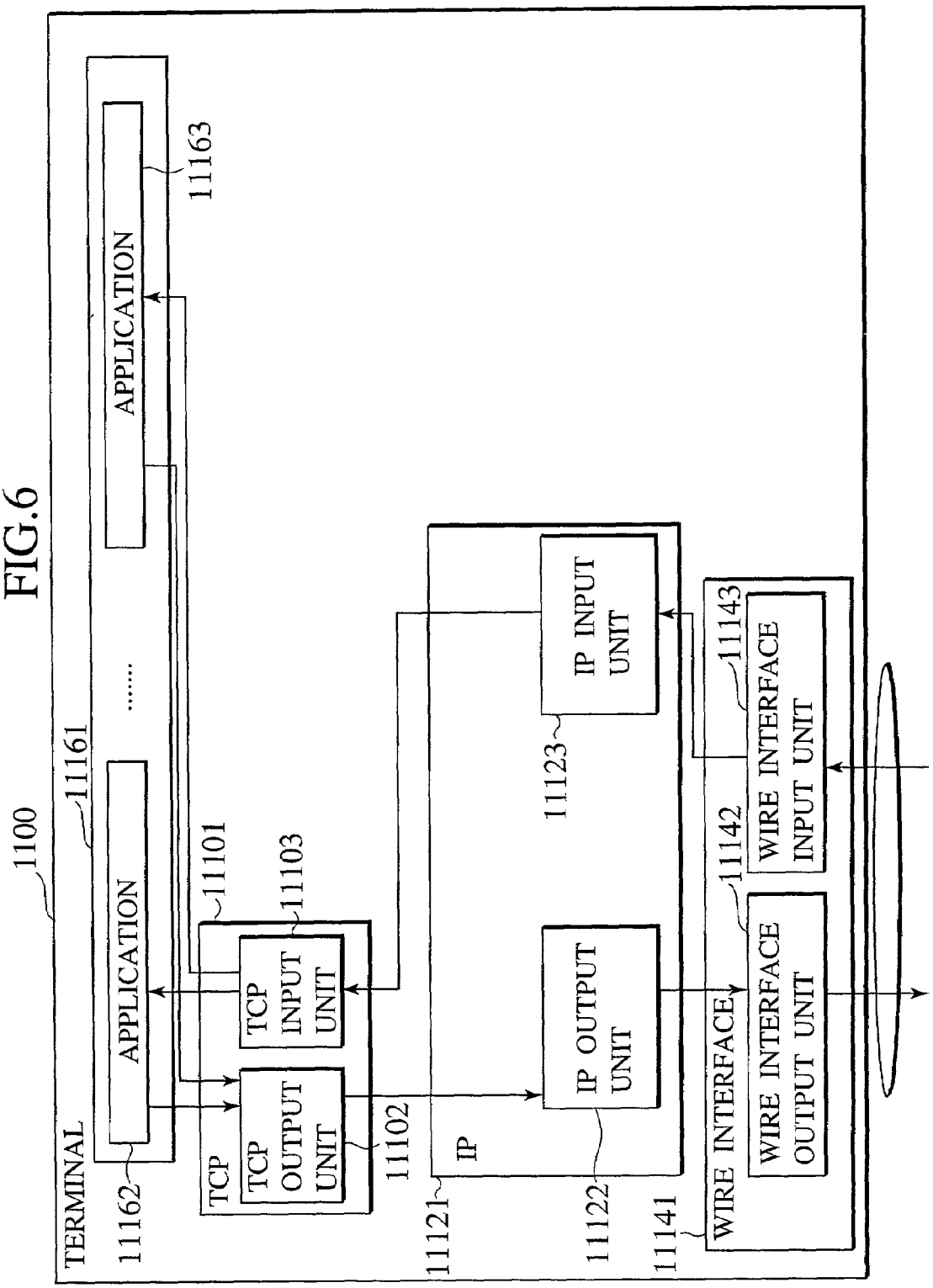
FIG. 6 is a block diagram showing an exemplary configuration of a terminal without IPSec function in the network configuration of FIG. 1.
Figure 7:
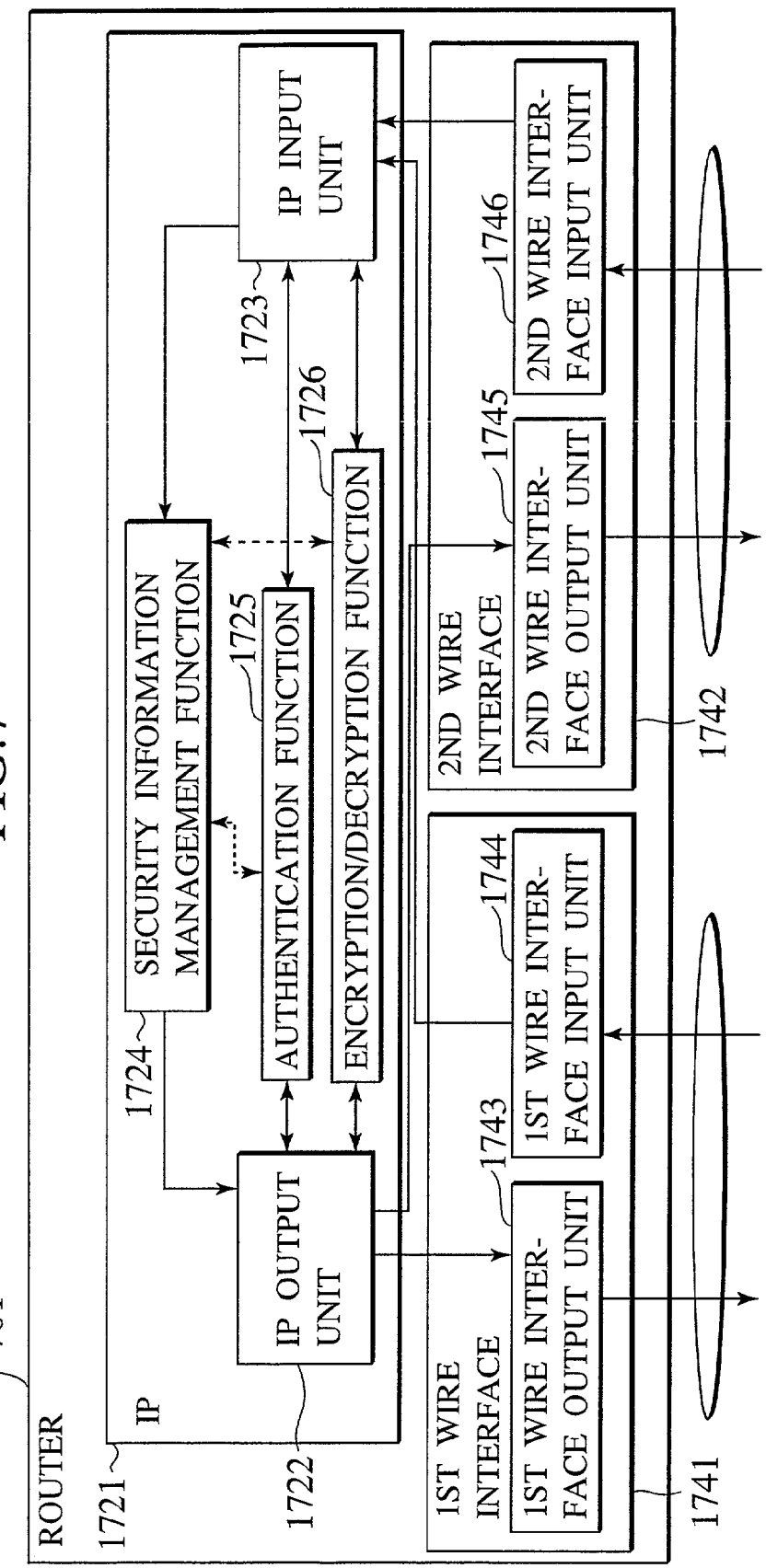
FIG. 7 is a block diagram showing an exemplary configuration of a router in the network configuration of FIG. 1.

FIG. 2 shows an exemplary configuration of a TCP-GW 400 that can be used as any of the TCP-GWs 401–403 of FIG. 1. Note that it is also possible to use the Snoop proxy, which has a different configuration. FIG. 3 shows an exemplary configuration of a terminal 100 that can be used as any of the terminals 101–103 of FIG. 1. FIG. 4 shows an exemplary configuration of a mobile terminal 500 that can be used as any of the mobile terminals 501–508 of FIG. 1. FIG. 5 shows an exemplary configuration of the security server 601 of FIG. 1. FIG. 6 shows an exemplary configuration of a terminal 1100 without an IPSec function, which can be used as any of the terminals 101–103 of FIG. 1. FIG. 7 shows an exemplary configuration of the router 701 of FIG. 1. In FIG. 2 to FIG. 7, the solid lines indicate data flows while dashed lines indicate control flows.

As shown in FIG. 2, the TCP-GW 400 comprises a TCP unit 1401, a TCP relay unit 1402, a radio TCP unit 1403, a TCP handoff control unit 1410, an IP unit 1421, a radio interface 1441, and a wire interface 1442. The TCP unit 1401 includes a TCP output unit 1404 and a TCP input unit 1405. The TCP relay unit 1402 includes a wire←radio relay unit 1406 and a wire→radio relay unit 1407. The radio TCP unit 1403 includes a radio TCP output unit 1408 and a radio TCP input unit 1409. The IP unit 1421 includes an IP output unit 1422, an IP input unit 1423, a security information management function 1424, an authentication function 1425, an encryption/decryption function 1426, and an IP relay function 1427. The radio interface 1441 includes a radio interface output unit 1443 and a radio interface input unit 1444. The wire interface 1442 includes a wire interface output unit 1445 and a wire interface input unit 1446.

As shown in FIG. 3, the terminal 100 comprises an application unit 1161, a TCP unit 1101, an IP unit 1121, and a wire interface 1141. The application unit 1161 includes a PEP-based application 1162 and a non-PEP-based application 1163. The TCP unit 1101 includes a TCP output unit 1102 and a TCP input unit 1103. The IP unit 1121 includes an IP output unit 1122, an IP input unit 1123, a security information management function 1124, an authentication function 1125, and an encryption/decryption function 1126. The wire interface 1141 includes a wire interface output unit 1142 and a wire interface input unit 1143.

As shown in FIG. 4, the mobile terminal 500 comprises an application unit 1561, a TCP unit 1501, an IP unit 1521, and a radio interface 1541. The application unit 1561 includes a PEP-based application 1562 and a non-PEP-based application 1563. The TCP unit 1501 includes a TCP output unit 1502 and a TCP input unit 1503. The IP unit 1521 includes an IP output unit 1522, an IP input unit 1523, a security information management function 1524, an authentication function 1525, and an encryption/decryption function 1526. The radio interface 1541 includes a radio interface output unit 1542 and a radio interface input unit 1543.

As shown in FIG. 5, the security server 601 comprises an IP unit 1621, and a wire interface 1641. The IP unit 1621 includes an IP output unit 1622, an IP input unit 1623, a security information management function 1624, an authentication function 1625, and an encryption/decryption function 1626. The wire interface 1641 includes a wire interface output unit 1642 and a wire interface input unit 1643.

As shown in FIG. 6, the terminal 1100 comprises an application unit 11161, a TCP unit 11101, an IP unit 11121, and a wire interface 11141. The application unit 11161 includes a PEP-based application 11162 and a non-PEP-based application 11163. The TCP unit 11101 includes a TCP output unit 11102 and a TCP input unit 11103. The IP unit 11121 includes an IP output unit 11122 and an IP input unit 11123. The wire interface 11141 includes a wire interface output unit 11142 and a wire interface input unit 11143.

As shown in FIG. 7, the router 701 comprises an IP unit 1721, a first wire interface 1741, and a second wire interface 1742. The IP unit 1721 includes an IP output unit 1722, an IP input unit 1723, a security information management function 1724, an authentication function 1725, and an encryption/decryption function 1726. The first wire interface 1741 includes a first wire interface output unit 1743 and a first wire interface input unit 1744. The second wire interface 1742 includes a second wire interface output unit 1745 and a second wire interface input unit 1746.

Now, in the network configuration of FIG. 1, the case of carrying out TCP/IP communications with the guaranteed security by utilizing the IPSec between the terminal 101 and the mobile terminal 501 will be considered as an example. In order to carry out communications according to the IPSec, there is a need to have an IPSec SA (Security Association) established between the terminal 101 and the mobile terminal 501.

The SA indicates a relationship in one direction, so that two SAs are necessary for a bidirectional relationship. The security protocol to be applied to one SA is limited to be just one. However, a plurality of SAs may be set up between two points if necessary. Information for identifying the SA includes (1) SPI (Security parameter Index), (2) IP destination address, and (3) Security protocol identifier. The SPI is a locally unique bit sequence. The SPI is contained in the AH and ESP headers, and will be used by the receiving side in determining the SA necessary in processing the received packet. The IP destination address indicates an end point of the SA. The end point of the SA can be an end user system, a firewall or the like. The Security protocol identifier indicates whether or not the SA uses AH or ESP.

A security association database (SAD) will contain the following information.

Sequence number counter, which will be used in generating a sequence number field of AH and ESP headers.

Sequence number counter overflow, which prohibits the packet transmission when the overflow occurred.

Anti-reply window, which indicates a sliding window range in which the sequence number should be included in order to guarantee that the AH or ESP packet is not that of a re-transmission by a third person.

AH information, which indicates an authentication algorithm, a key, a valid period of the key, and parameters related to AH.

ESP information, which indicates an encryption/decryption and authentication algorithms, a key, a value for initialization, a valid period of the key, and parameters related to ESP.

Valid period of SA, which indicates a time interval or a number of bytes specifying a period in which this SA should be replaced by a new SA, and an indication as to whether such a replacement should be carried out or not.

IPSec protocol mode, which indicates one of a tunnel mode, a transport mode, and a wild card mode.

Path MTU (Maximum Transmission Unit), which indicates the maximum transmission unit (a maximum size by which the transmission through that path is possible without generating IP fragments) of the monitored path, and how old that information is.

The manner of applying the IPSec to the IP traffic can be determined according to the user's policy. Namely, the user can select whether or not to apply the IPSec, as well as which SA should be utilized in the case of applying the IPSec. Information on such selections is to be included in a security policy database (SPD).

Entries of the SPD are defined by the following selectors.

Destination IP address, which may indicate a range.

Source IP address, which may indicate a range.

User ID, which is a user identifier of the system.

Data sensitivity level, which indicates whether it is secret or not, or the like.

Transport layer protocol, which indicates a protocol number for specifying UDP, TCP, etc.

IPSec protocol, which indicates AH, ESP, or AH/ESP.

Source and destination ports, which indicates a port number of TCP or UDP.

IPv6 class and IPv6 flow label.

IPv4 Type of Service (TOS).

Each entry of the SPD so defined corresponds to one or more SAs.

The SA may be set up manually, but the SA can be set up automatically by the Internet Key Exchange (IKE). The IKE contains two phases. In the phase 1, the IKE SA is established to ensure the safety of the subsequent communications. In the phase 2, SA parameters for AH or ESP are exchanged under the IKE SA.

Now, in order for a proxy such as the TCP-GW to function properly, there is a need for the TCP-GW to know at least a part of the SA information in advance. More specifically, this SA information that should be known to the TCP-GW includes information necessary in decrypting data in order to carry out necessary processing and encrypting data after the necessary processing is done, and/or information necessary in generating a packet in a properly authenticated format at the proxy in the case of generating a packet at the proxy.

As a scheme for enabling the proper functioning of such a proxy, the following schemes are available.

(Scheme 1) The necessary information is set up manually.

(Scheme 2) The necessary information is obtained from the SA information exchanged in the phase 2 of the IKE. Namely, the necessary information is given to the proxy by an entity which has the IKE SA information and received the IPSec SA information.

(Scheme 3) The necessary information is provided from one end point of the SA.

(Scheme 4) The SA information is generated by the proxy itself, or the SA information is generated by a security server and provided from the security server to each end point as well as to the proxy if necessary.

In the following, the scheme 3 and the scheme 4 will be described in detail.

First, the scheme 3 will be described. Suppose that the IKE SA is already established between the terminal 101 and the mobile terminal 501. Here, there can be case where the IPSec SA to be applied to communications to be carried out subsequently is already established, and case where it is not yet established. In the case where the IPSec SA is not yet established, the IPSec SA can be established by the procedure of the phase 2 of the IKE between the security information management function 1124 of the terminal 101, and the security information management function 1524 of the mobile terminal 501. Each of the security information management functions 1124 and 1524 stores related information generated by this IPSec SA establishing into the own SAD and SPD.

Note that the IPSec SA that permits the intervention of the proxy and the IPSec SA that does not permit the intervention of the proxy may be provided. In addition, it is also possible to provide a class that permits the decryption at the proxy but does not permit the new packet generation or the packet content modification at the proxy. To this end, it is natural to provide a classification for identifying the class in the data sensitivity level selector of the SPD, but it is also possible to identify the class by the port number, for example.

In the following, the IPSec that permits the intervention of the proxy will be mainly used. The IPSec SA that does not permit the intervention of the proxy operates similarly as the conventional IPSec.

Now, the terminal 101 and the mobile terminal 501 treat the security server 601 and the TCP-GWs 401–403 as reliable devices. For example, it is possible to consider the case where those devices are operated as reliable devices by some reliable network management entity. Here, it is assumed that the need to provide the IPSec SA information to the security server 601 in order to utilize the proxy function of the TCP-GW of the network is already recognized by at least one of the terminal 101 and the mobile terminal 501.

Note that it is also possible to make the TCP-GW properly functioning by providing the IPSec SA information directly to the TCP-GW rather than to the security server 601, but in this case there is a need for the terminal 101 or the mobile terminal 501 to recognize the individual proxy to be utilized and this is rather inconvenient because the existence of the TCP-GW or Snoop proxy is normally invisible from the terminals. Also, the IPSec SA information can be provided by either one of the terminal 101 and the mobile terminal 501, but it is assumed here that the IPSec SA information is provided by the mobile terminal 501 which can more easily comprehend the fact that radio compatible proxy should be utilized.

First, some security association between the mobile terminal 501 and the security server 601 is necessary in order to protect the IPSec SA information to be transmitted subsequently. It is assumed here that the IPSec is to be used for this security association. The IKE SA is established between the mobile terminal 501 and the security server 601 first, and the IPSec SA that uses both AH and ESP is established next. Using this IPSec SA, the IPSec SA information that permits the proxy intervention between the terminal 101 and the mobile terminal 501 is transmitted toward the security information management function 1624 of the security server 601 from the security information management function 1524 of the mobile terminal 501. The security information management function 1624 stores this IPSec SA information into the SPD and SAD.

In the following, the TCP-GW 401 acquires the IPSec SA information from the security server 601 at a time of detecting the traffic between the terminal 101 and the mobile terminal 501. Here, it is assumed that the traffic for the purpose of establishing the IPSec SA that permits the proxy intervention is detected by using the IKE SA. The IKE utilizes the port number 500 of the UDP, so that the presence of this communication can be detected by monitoring the IP header at the IP input unit 1423. The other type of communication between the terminal 101 and the mobile terminal 501 may be used instead.

The presence of this communication implies that there is a high possibility for having some communications subsequently. Consequently, the security information management function 1424 of the TCP-GW 401 requests the security information management function 1624 of the security server 601 to provide the information regarding the IPSec SA between the terminal 101 and the mobile terminal 501. For example, a set of IP addresses of the terminal 101 and the mobile terminal 501 can be stored in the security server 601 as a retrieval key in advance for this purpose.

The security information management function 1624 of the security server 601 may not have the IPSec SA between the terminal 101 and the mobile terminal 501 yet at a timing of receiving the request from the security information management function 1424 of the TCP-GW 401. This is because this request is made by detecting the traffic for setting up the IPSec SA. The security information management function 1624 memorizes the fact of receiving this request until the time-out timing, and provides the IPSec SA information to the security information management function 1424 of the TCP-GW 401 whenever the IPSec SA information corresponding to the request is obtained.

When the security information management function 1424 of the TCP-GW 401 obtains the information regarding the IPSec SA between the terminal 101 and the mobile terminal 501 from the security information management function 1624 of the security server 601 in this way, this information is stored into the SPD and SAD in the security information management function 1424. In addition, a filter is set up in the IP input unit 1423 such that a received packet is raised up to the TCP layer when it satisfies a condition that it is a packet according to the IPSec SA that permits the proxy intervention between the terminal 101 and the mobile terminal 501 and it is a packet for communication using TCP. Note that the request is to be updated when the communication between the terminal 101 and the mobile terminal 501 is expected to pass through the TCP-GW 401 at a timing of the time-out of the IPSec SA information request.

Next, the PEP-based application 1162 of the terminal 101 and the PEP-based application 1562 of the mobile terminal 501 carry out the communication by utilizing the IPSec SA that permits the proxy intervention. Here, the applications are classified according to whether the proxy intervention is permitted or not for the sake of convenience, and the applications can be used separately for different TCP connections in practice. Suppose that the PEP-based application 1162 carries out the TCP connection set up with respect to the PEP-based application 1562. The PEP-based application 1162 can request the TCP connection set up to the OS using the socket interface of the UNIX, for example.

At this point, whether or not to permit the proxy intervention can be specified for this TCP connection by using options of the socket, for example. As already mentioned above, it is assumed that the proxy intervention is to be permitted here. This can be done by setting a value in the data sensitivity level selector of the SPD, for example. Values of the other selectors can be set, for example, such that the destination IP address is given by the IP address of the mobile terminal 501, the source IP address is given by the IP address of the terminal 101, the user ID is given by the user identifier of the PEP-based application 1162, the transport layer protocol is given by TCP, the IPSec protocol is given by AH/ESP (AH or ESP is also possible), and the source and destination ports are given by appropriate port numbers.

Figure 8:
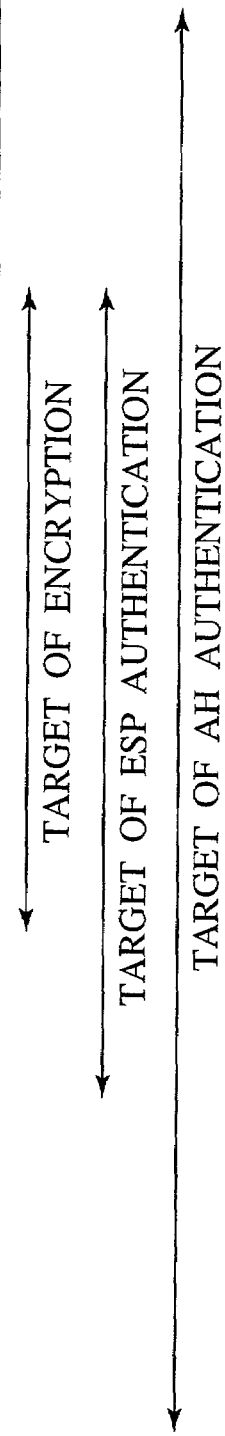
FIG. 8 is a diagram showing exemplary packet formats before and after the IPSec processing to be carried out at the TCP-GW of FIG. 2.

The security information management function 1124 that is monitoring the IP output unit 1122 searches through the SDP entries for each output IP packet, and finds the corresponding IPSec SA. Here, a packet which has the above described selector values corresponds with the above described IPSec SA that permits the proxy intervention. Then, the security information management function 1124 controls the authentication function 1125 and the encryption/decryption function 1126 to attach information necessary for the authentication to the packet and encrypts the packet using the algorithm and the key specified in the IPSec SA. Among the transport mode and the tunnel mode, it is assumed that the transport mode will be utilized here, so that the packet shown in a part (a) of FIG. 8 is processed into a format shown in a part (b) of FIG. 8. Here, in general, a boundary between the TCP header and the data is not preserved after the encryption. Also, the target of AH authentication does not include a portion that can change unpredictably due to the change of the IP header on the route (such as TTL, for example).

The packet so processed is transmitted to the network 201 by the wire interface output unit 1142, and reaches to the TCP-GW 401 via the router 701 and the network 202. The packet arrived at the IP input unit 1423 via the wire interface input unit 1446 is then processed according to the specification of the IPSec SA that is identified by SPI (Security Parameter Index), the IP destination address, and the Security protocol identifier. The values of the parameters to be identified are as provided from the security server 601 and set up in the IP input unit 1423 by the security information management function 1424. Then, the security information management function 1424 controls the authentication function 1425 and the encryption/decryption function 1426 to recover the original packet format shown in a part (a) of FIG. 8 from the IPSec packet format shown in a part (b) of FIG. 8.

The IP input unit 1423 judges whether the TCP relay processing is to be carried out or not according to the information of the original packet, and gives the packet to the TCP input unit 1405 by judging that the TCP relay processing is to be carried out. The most simple judgment criterion is that all packets are to be relayed by utilizing the TCP connection as long as TCP is used, but it is also possible to use the other attributes such that there are cases of not relaying packets by utilizing the TCP connection even though TCP is used (in which cases the IP relaying will be carried out). This packet is then processed according to its content, by the wire→radio relay unit 1407 of the TCP relay unit 1402, the TCP input unit 1405 and the radio TCP output unit 1408.

For example, if this is a SYN packet which indicates that a new TCP connection is to be set up, then the corresponding state is generated. If necessary appropriate options can be added, and then this packet is relayed to the radio TCP output unit 1408. In addition, the SYN/ACK is returned from the TCP output unit 1404 (this will be omitted in the case of the Snoop proxy). As another example, if this is a data packet, there is a possibility for re-transmitting this packet later on, so that a copy is stored into a buffer and then this packet is given to the radio TCP output unit 1408. In addition, ACK with respect to this data packet is returned from the TCP output unit 1404 (this will be omitted in the case of the Snoop proxy). Note that, in all the packets to be handled here including those generated by the TCP-GW 401, an IP header address field is set up as if it is transmitted and received between the terminal 101 and the mobile terminal 501. In other words, the existence of the TCP-GW 401 is hidden.

The radio TCP output unit 1408 and the TCP output unit 1404 give packets to the IP output unit 1422. The security information management function 1424 obtains the selector information for identifying the SPD entries from the information on the packets, searches through the SPD and obtains the corresponding IPSec SA. Then, the information regarding this IPSec SA is obtained from the SAD, and the authentication function 1425 and the encryption/decryption function 1426 are controlled according to that information, such that the packets are converted into the IPSec packet in a format shown in a part (b) of FIG. 8 again.

Here, the IPSec packet received by the TCP-GW and the IPSec packet to be transmitted from the TCP-GW have different packet contents in general, even though they are both in the same IPSec packet format. For example, the TCP-GW 401 generates ACK rather than relaying it, so that the sequence number of the IPSec AH or ESP to be attached for the purpose of error correction is different in general. These packets are transmitted from the radio interface output units 1443 to the network 203 or from the wire interface output unit 1445 to the network 202.

Note that in the case of the Snoop proxy, the IPSec packet received by the Snoop proxy and the IPSec packet to be transmitted from the Snoop proxy can be made to have the identical packet content in many cases.

The Snoop proxy may discard the redundant ACK rather than relaying it, but this is equivalent to the natural loss in the IP network so that it causes no problem as far as the IPSec is concerned. The Snoop proxy may also carry out the re-transmission on behalf of the actual TCP transmitting host, by re-transmitting a copy of the original, but there is a possibility for this copy to be discarded at the receiving terminal by the Anti-reply of the IPSec. In order to prevent this, the sequence number for the purpose of the authentication needs to be contained in the ANti-reply window range. When these conditions are satisfied, in the case of the Snoop proxy, it suffices to be able to obtain the original TCP/IP header information from the IPSec packet, and the packet that is converted back to the original format need not be converted into the IPSec packet format once again. Consequently, by not giving the key information to be used for the authentication to the Snoop proxy, it is possible for the IPSec to guarantee that there is no information alteration between the terminal 101 and the mobile terminal 501 and that it is a packet transmitted from the actual sender. The Snoop proxy can be made to function properly by providing the SA information necessary for the decryption.

The packet transmitted to the network 203 is received by the mobile terminal 501 via the base station 301. The packet arrived at the IP input unit 1523 via the radio interface input unit 1543 is then processed according to the specification of the IPSec SA that is identified by SPI (Security Parameter Index), the IP destination address, and the Security protocol identifier. Then, the security information management function 1524 controls the authentication function 1525 and the encryption/decryption function 1526 to recover the original packet format shown in a part (a) of FIG. 8 from the IPSec packet format shown in a part (b) of FIG. 8. Then, the information loaded in the packet is given to the PEP-based application 1562.

Next, the scheme 4 in which the security server 601 generates the IPSec SA information and gives the generated IPSec SA information to the terminal 101, the mobile terminal 501 and the TCP-GW 401 will be described.

The security information management function 1524 of the mobile terminal 501 solicits the generation of the IPSec SA information that permits the proxy intervention between the terminal 101 and the mobile terminal 501, with respect to the security information management function 1624 of the security server 601. For this solicitation, the communication path with the security ensured by the IPSec or the like is used. The security information management function 1624 generates the IPSec SA information corresponding to this solicitation, and provides this information to the mobile terminal 501, the terminal 101 and the TCP-GW 401 through the communication paths with the ensured security.

This information can be provided as a response to the solicitation with respect to the mobile terminal 501. This information can be provided to the terminal 101 either directly from the security server 601 or from the mobile terminal 501. This information can be voluntarily transmitted by the security server 601 to the TCP-GW 401 when it is possible to judge that the TCP-GW 401 has a high possibility of utilizing this IPSec SA according to the location information of the mobile terminal 501, for example. Else, the TCP-GW 401 should request this information to the security server 601 upon detecting the communication between the terminal 101 and the mobile terminal 501. It is also possible to provide this information to all the TCP-GWs 401–403, but this is inefficient and increases a risk in view of the security. These communications are carried out among the security information management functions 1124, 1524, 1424 and 1624 of the terminal 101, the mobile terminal 501, the TCP-GW 401 and the security server 601. Once the IPSec SA information is provided to the TCP-GW 401, the subsequent operations are the same as in the scheme 3 described above so that their description will be omitted here.

Next, the proxy handoff control for changing the TCP-GW in conjunction with the moving of a mobile terminal such as the mobile terminal 501, for example, will be described.

For this purpose, there is a need to inherit the information on a state of the relay target TCP connection that is terminated at the mobile terminal 501 and the IPSec SA information corresponding to the mobile terminal 501 from the previous TCP-GW such as the TCP-GW 401, for example, to the next TCP-GW such as the TCP-GW 402, for example. The TCP-GW 402 searches out the previous TCP-GW in some way upon detecting the communication originated or terminated at the mobile terminal 501, and requests the information necessary in carrying out the handoff processing.

To this end, it is effective for the TCP-GWs to recognize the neighboring TCP-GWs each other in advance. For example, the following schemes can be used.

(Scheme A) Each TCP-GW recognizes those TCP-GWs that are located at close physical distances.

(Scheme B) Each TCP-GW recognizes those TCP-GWs that are located at close network distances (such as hop numbers, delays, etc).

In view of the fact that the handoff becomes necessary as a result of the physical movement of the mobile terminal, the scheme A is more preferable, but there can be cases where the physical location cannot be known so that the scheme B should be utilized.

In order to realize the scheme A, a proxy management server 801 can be provided, for example, in the network configuration shown in FIG. 1.

Assuming that the TCP-GW 401 already knows the physical locations of the base stations 301 and 302, the TCP-GW 402 already knows the physical locations of the base stations 303 and 304, and the TCP-GW 403 already knows the physical locations of the base stations 305 and 306, they notify the information on these physical locations to the proxy management server 801. The proxy management server 801 then judges that the handoff between the TCP-GWs 401 and 402, and the handoff between the TCP-GWs 402 and 403 can possibly occur. Then, the proxy management server 801 notifies that the potential handoff target is the TCP-GW 402 to the TCP-GW 401, that the potential handoff targets are the TCP-GWs 401 and 403 to the TCP-GW 402, and that the potential handoff target is the TCP-GW 402 to the TCP-GW 403. These processings are carried out by the TCP handoff control units 1410 of the TCP-GWs 401–403 and the proxy management server 801. It is also possible to set the above information manually at the TCP-GWs 401–403.

In order to realize the scheme B, the following procedure can be used, for example.

A multicast group to which all the TCP-GWs belong is defined, and a multicast packet with the appropriately limited TTL is transmitted by the TCP handoff control unit 1410 of each TCP-GW in order to make an inquiry. Each TCP handoff control unit 1410 that received this multicast packet then returns a response to the sender by the unicast, such that the TCP-GW with the least hop number can be found out.

Now, suppose that the communication using TCP is carried out between the terminal 101 and the mobile terminal 501 through the TCP-GW 401 under the IPSec SA that permits the proxy intervention as described above. Here, the transfer of the information in conjunction with the proxy handoff can be realized in several variations.

The case of transferring information that can be transferred in advance to the potential handoff target TCP-GW in advance, and the case of not doing this. In the former case, the following variations are possible.

The case of utilizing the relay target terminal: when the new TCP-GW detects the communication of this terminal, which TCP-GW should be inquired in order to obtain the necessary information can be ascertained.

The case of utilizing the IPSec SA information: in which the decrease of the handoff delay can be expected.

The case of inquiring by unicast, and the case of inquiring by multicast.

The case of using unicast: The inquiry is to be made individually with respect to all the TCP-GWs that can potentially be the previous TCP-GW. If the above described relay target terminal information or IPSec SA information is available, the inquiry is made with respect to the TCP-GW that provided that information.

The case of using multicast: A multicast group to which all the TCP-GWs that can potentially be the previous TCP-GW belong is defined, and the inquiry is made with respect to this multicast group.

Note that the communication involving the handoff is carried out by using the communication path with the ensured security as a general rule.

Here, it is assumed that the IPSec SA information is given in advance from the security information management function 1424 of the TCP-GW 401 to the security information management function 1424 of the TCP-GW 402. When the new IPSec SA information is obtained from the security server 601, the security information management function 1424 of the TCP-GW 401 inquires the TCP handoff control unit 1410 about target TCP-GWs to which this IPSec SA information should be provided. In this case, it should be provided to the TCP-GW 402, so that the security information management function 1424 of the TCP-GW 401 provides this IPSec SA information to the security information management function 1424 of the TCP-GW 402. The security information management function 1424 of the TCP-GW 402 stores this IPSec SA information into the SPD and the SAD, as well as the fact that this information is provided from the TCP-GW 401 and the time at which this information is provided.

Suppose now that the mobile terminal 501 has moved from the area of the base station 301 to the area of the base station 303 via the area of the base station 302. Then, the TCP-GW 402 detects the communication between the terminal 101 and the mobile terminal 501. The security information management function 1424 of the TCP-GW 402 recognizes that the IPSec SA information between the terminal 101 and the mobile terminal 501 is most recently provided by the TCP-GW 401, so that the security information management function 1424 of the TCP-GW 402 notifies to the TCP handoff control unit 1410 that the information necessary for the TCP relaying handoff can be obtained from the TCP-GW 401. Also, the security information management function 1424 of the TCP-GW 402 notifies the corresponding IPSec SA information to the security information management function 1424 of the TCP-GW 403. The reason why the IPSec SA information that was already known earlier is to be notified at this timing is that the possibility of the handoff to the TCP-GW 403 arose at this timing.

The TCP handoff control unit 1410 of the TCP-GW 402 sets up the information necessary for the TCP relaying with respect to the TCP unit 1401 and the radio TCP unit 1403, from the information on the TCP connection between the terminal 101 and the mobile terminal 501 that is obtained from the TCP handoff control unit 1410 of the TCP-GW 401. For example, this information can include information related to the sequence number and the window control, the TCP options that are set up, the data packets temporarily stored in the buffer, etc.

At a time of restarting the TCP relaying, the processing is carried out to avoid the disturbance in the TCP sequence number as much as possible. In other words, if the TCP sequence numbers of the data packets temporarily stored in the buffer are less than the sequence numbers of the TCP data packets flowing between the terminal 101 and the mobile terminal 501, these temporarily stored data packets will be relayed earlier. The subsequent TCP relaying processing and the IPSec related processing can be realized similarly as already described above.

Next, the case where the terminal 102 is an IP terminal without the IPSec function, and the packets not protected by the IPSec that are transmitted from the network 102 to the network 201 are protected by the router 701 using the IPSec tunnel mode as a security service will be described. In particular, a method for handling the encapsulated packets at the proxy will be described. This method is also applicable to the other cases using the encapsulation such as the case of the Mobile IP.

Consider the communication between the terminal 102 and the mobile terminal 502. Here, the mobile terminal 502 is a terminal with the IPSec function which is in a configuration shown in FIG. 4, while the terminal 102 is a terminal without the IPSec function which is in a configuration shown in FIG. 6, In the case of carrying out the communication between them, the communication utilizing the IPSec is carried out between the mobile terminal 502 and the router 701 which is in a configuration shown in FIG. 7, To this end, the IPSec SA is established between the router 701 and the mobile terminal 502 and the information of the IPSec SA that permits the proxy intervention is provided to the TCP-GW 401 that requires it, through the security server 601, by the procedures similar to those described above. At this point, the IPSec tunnel mode is utilized. The packet between the terminal 102 and the mobile terminal 502 has a format as shown in a part (a) of FIG. 9.

The relaying processing at the TCP-GW 401 is carried out similarly as described above. Here, however, whether or not the TCP relaying should be carried out for the packet after the conversion from the IPSec packet format and decapsulation under the security information management function 1424 is judged by the IP input unit 1423, and this packet is given to the TCP unit 1401 if necessary. Also, at a time of transmitting the packet, the processing for the conversion to the IPSec packet format and the encapsulation is carried out, as shown in a part (b) of FIG. 9, The switching of the processing from that described above can be realized according to whether the value of the IPSec protocol mode contained in the IPSec SA information obtained from the SAD is the transport mode or the tunnel mode. This can also be done by recognizing that the new IP header is the encapsulating header. This is also applicable to the case of the proxy located in a middle of the tunnel in general, as in the case of the TCP-GW that handles encapsulated TCP/IP packets between the Home Agent and the Foreign Agent in the Mobile IP (IETF RFC 2002), for example.

As described, according to the present invention, it is possible to improve the performance under the radio environment by using the proxy such as TCP-GW or Snoop proxy, even with respect to the communications with the security guaranteed by using the IPSec or the like.

It is to be noted that the present invention is equally applicable to the IPv6.

It is also to be noted that the present invention is applicable not only to the communications between the wired terminal and the radio terminal, but also to the communications between the radio terminal and the radio terminal.

It is also to be noted that the above described embodiment according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the proxy device of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A gateway device for carrying out a packet relaying at a transport or upper layer between a sender device and a destination device which are capable of carrying out communications through networks with data secrecy based on a security association set up therebetween, the gateway device comprising:
   a security information management unit configured to obtain and manage information regarding the security association;
   a data receiving unit configured to receive a first packet which includes a first header and an encrypted packet from the sender device;
   a data decryption unit configured to decrypt the encrypted packet to obtain a second packet including a second header and data by utilizing the information regarding the security association and to check the second header;
   a packet relay unit configured to carry out the packet relaying at the transport or upper layer according to the second header;
   a data encryption unit configured to encrypt the second packet to obtain an encrypted second packet by utilizing the information regarding the security association, no header being newly attached to the encrypted second packet; and
   a data transmitting unit configured to transmit the encrypted second packet with attaching the first header to the destination device.

2. The gateway device of claim 1, wherein the gateway device carries out the packet relaying between the sender device which is a radio terminal device accommodated in a radio network and the destination device which is a wired terminal device accommodated in a wired network.

3. The gateway device of claim 1, wherein the security information management unit manages the information regarding the security association which is provided from the sender device.

4. The gateway device of claim 1, wherein the security information management unit manages the information regarding the security association which is provided from a security server for managing security of the data at a time of carrying out the communications of the data of the transport or upper layer between the sender device and the destination device.

5. The gateway device of claim 1, wherein the security information management unit manages the information regarding the security association which is generated by a security server for managing security of data and distributed from the security server to the sender device and the destination device.

6. The gateway device of claim 1, wherein the security information management unit manages the information regarding the security association which is retrieved from a database by a security server for managing security of data by using a retrieval key provided with respect to the sender device and the destination device.

7. The gateway device of claim 1, wherein the sender device is a mobile terminal device, and the gateway device further comprises:
   a handoff control unit configured to transfer the information regarding the security association to a next gateway device when the mobile terminal device moves from an area covered by the gateway device to an area covered by the next gateway device, and to control an operation of the gateway device according to the information regarding the security association which is transferred from a previous gateway device when the mobile terminal device moves from an area of the previous gateway device to an area covered by the gateway device.

8. The gateway device of claim 7, wherein the handoff control unit controls the operation of the gateway device also according to a state of the transport or upper layer.

9. The gateway device of claim 1, further comprising:
   a processing unit configured to obtain decapsulated packet by decapsulating encapsulated packet received from the sender device, judge whether the packet relaying at the transport or upper layer is necessary or not according to the decapsulated packet, control the data relay unit to carry out the data relaying at the transport or upper layer when the data relaying at the transport or upper layer is judged as necessary, and encapsulate the decapsulated packet.

10. The gateway device of claim 1 further comprising:
    an authentication information attaching unit configured to attach authentication information to the received first packet to be transmitted from the gateway device by utilizing the information regarding the security association; and
    the data transmitting unit configured to transmit the received first packet with the authentication information to the destination device.

11. The gateway device of claim 10, wherein the gateway device carries out the packet relaying between the sender device which is a radio terminal device accommodated in a radio network and the destination device which is a wired terminal device accommodated in a wired network.

12. The gateway device of claim 10, wherein the security information management unit manages the information regarding the security association which is provided from the sender device.

13. The gateway device of claim 10, wherein the security information management unit manages the information regarding the security association which is provided from a security server for managing security of data at a time of carrying out the communications of the data of the transport or upper layer between the sender device and the destination device.

14. The gateway device of claim 10, wherein the security information management unit manages the information regarding the security association which is generated by a security server for managing security of data and distributed from the security server to the sender device and the destination device.

15. The gateway device of claim 10, wherein the security information management unit manages the information regarding the security association which is retrieved from a database by a security server for managing security of data by using a retrieval key provided with respect to the sender device and the destination device.

16. The gateway device of claim 10, wherein the sender device is a mobile terminal device, and the gateway device further comprises:
    a handoff control unit configured to transfer the information regarding the security association to a next gateway device when the mobile terminal device moves from an area covered by the gateway device to an area covered by the next gateway device, and to control an operation of the gateway device according to the information regarding the security association which is transferred from a previous gateway device when the mobile terminal device moves from an area of the previous gateway device to an area covered by the gateway device.

17. The gateway device of claim 16, wherein the handoff control unit controls the operation of the gateway device also according to a state of the transport or upper layer.

18. The gateway device of claim 10, further comprising:
a processing unit configured to obtain decapsulated packet by decapsulating encapsulated packet received from the sender device, judge whether the packet relaying at the transport or upper layer is necessary or not according to the decapsulated packet, control the data relay unit to carry out the data relaying at the transport or upper layer when the data relaying at the transport or upper layer is judged as necessary, and encapsulate the decapsulated packet.

19. A method for carrying out a packet relaying at a transport or upper layer in a gateway device between a sender device and a destination device which are capable of carrying out communications through networks with data secrecy based on a security association set up therebetween, the method comprising;
obtaining and managing information regarding a security association;
receiving data first packet which includes a first header and an encrypted packet from the sender device;
decrypting the encrypted packet to obtain a second packet including a second header and data by utilizing the information regarding the security association and checking the second header;
carrying out the packet relaying at the transport or upper layer according to the second header;
encrypting the second packet to obtain an encrypted second packet by utilizing the information regarding the security association, no header being newly attached to the encrypted second packet; and
transmitting the encrypted second packet with attaching the first header to the destination device.

20. The method of claim 19 further comprising:
attaching authentication information to the received first packet to be transmitted from the gateway device by utilizing the information regarding the security association; and
transmitting the received first packet with the authentication information to the destination device.

21. A computer usable medium having computer readable program codes embodied therein for causing a computer to function as a gateway device for carrying out a packet relaying at a transport or upper layer between a sender device and a destination device which are capable of carrying out communications through networks with data secrecy based on a security association set up therebetween, the computer readable program codes include:
a first computer readable program code for causing said computer to obtain and manage information regarding a security association;
a second computer readable program code for causing said computer to receive a first packet which includes a first header and an encrypted packet from the sender device;
a third computer readable program code for causing said computer to decrypt the encrypted packet to obtain a second packet including a second header and data by utilizing the information regarding the security association and to check the second header;
a fourth computer readable program code for causing said computer to carry out the packet relaying at the transport or upper layer according to the second header;
a fifth computer readable program code for causing said computer to encrypt the second packet to obtain an encrypted second packet by utilizing the information regarding the security association, no header being newly attached to the encrypted second packet; and
a sixth computer readable program code for causing said computer to transmit the encrypted second packet with attaching the first header to the destination device.

22. The computer usable medium of claim 21, the computer readable program codes further including:
a seventh computer readable program code for causing said computer to attach authentication information to the received first packet to be transmitted from the gateway device by utilizing the information regarding the security association; and
an eighth computer readable program code for causing said computer to transmit the received first packet with the authentication information to the destination device.

23. A gateway device for carrying out a packet relaying at a transport or upper layer between a sender device and a destination device which are capable of carrying out communications through networks with data secrecy based on a security association set up therebetween, the gateway device comprising:
a security information management unit configured to obtain and manage information regarding the security association;
a data receiving unit configured to receive a first packet which includes a first header and an encrypted packet from the sender device;
a data decryption unit configured to decrypt the encrypted packet to obtain a second packet including a second header and data by utilizing the information regarding the security association and to check the second header;
a packet relay unit configured to carry out the packet relaying at the transport or upper layer according to the second header;
a data encryption unit configured to receive the second packet directly from the decryption unit and encrypt the second packet to obtain an encrypted second packet by utilizing the information regarding the security association; and
a data transmitting unit configured to transmit the encrypted second packet with attaching the first header to the destination device.

* * * * *